(12) United States Patent
Karakawa

(10) Patent No.: US 7,866,869 B2
(45) Date of Patent: Jan. 11, 2011

(54) LASER ILLUMINATED BACKLIGHT FOR FLAT PANEL DISPLAYS

(75) Inventor: Masayuki Karakawa, Newmarket, NH (US)

(73) Assignee: Corporation for Laser Optics Research, Portsmouth, NH (US)

( * ) Notice: Subject to any disclaimer, the term of this patent is extended or adjusted under 35 U.S.C. 154(b) by 263 days.

(21) Appl. No.: 12/259,000

(22) Filed: Oct. 27, 2008

(65) Prior Publication Data

US 2009/0109658 A1    Apr. 30, 2009

Related U.S. Application Data

(60) Provisional application No. 61/000,475, filed on Oct. 26, 2007.

(51) Int. Cl.
*F21V 7/04* (2006.01)
(52) U.S. Cl. .................. 362/613; 362/231; 362/612; 349/65
(58) Field of Classification Search .................. 362/231, 362/612, 613; 349/62, 65
See application file for complete search history.

(56) References Cited

U.S. PATENT DOCUMENTS

| | | | |
|---|---|---|---|
| 4,599,730 A | 7/1986 | Eden et al. | |
| 4,603,421 A | 7/1986 | Scifres et al. | |
| 5,715,021 A | 2/1998 | Gibeau et al. | |
| 5,774,487 A | 6/1998 | Morgan | |
| 5,990,983 A | 11/1999 | Hargis et al. | |
| 6,011,643 A | 1/2000 | Wunderlich et al. | |
| 6,154,259 A | 11/2000 | Hargis et al. | |
| 6,283,597 B1 | 9/2001 | Jorke et al. | |
| 6,304,237 B1 | 10/2001 | Karakawa | |
| 6,590,698 B1 | 7/2003 | Ohtsuki et al. | |
| 6,939,027 B2 * | 9/2005 | Harumoto | 362/336 |
| 6,975,294 B2 * | 12/2005 | Manni et al. | 345/83 |
| 2010/0149222 A1 | 6/2010 | Welford et al. | |
| 2010/0182536 A1 | 7/2010 | Karakawa | |

FOREIGN PATENT DOCUMENTS

| | | |
|---|---|---|
| EP | 0 603826 | 6/1994 |
| WO | WO-95/20811 | 8/1995 |
| WO | WO-2006/059264 | 6/2006 |
| WO | WO-2007/049823 | 5/2007 |
| WO | WO-2007/083805 | 7/2007 |
| WO | WO-2007/094304 | 8/2007 |

* cited by examiner

*Primary Examiner*—Ali Alavi
(74) *Attorney, Agent, or Firm*—Ropes & Gray LLP

(57) ABSTRACT

Laser lit flat panel displays are disclosed including edge-lit and direct lit backlights. In certain embodiments, laser assemblies are selected to obtain bandwidth distributions to reduce speckle.

12 Claims, 8 Drawing Sheets

LASER ILLUMINATED BACKLIGHT FOR FLAT PANEL DISPLAYS

CROSS REFERENCE TO RELATED APPLICATIONS

This application claims the benefit of U.S. Provisional Application Ser. No. 61/000,475, filed Oct. 26, 2007, the entire contents of which are incorporated herein by reference.

BACKGROUND OF THE INVENTION

Red, green, and blue (RGB) lasers offer demonstrable benefits over fluorescent lamps and light emitting diodes for high-performance imaging applications. Greater color saturation, contrast, sharpness, and color-gamut are among the most compelling attributes distinguishing laser displays from conventional imaging systems.

To compare laser illumination technology with conventional technologies, it is instructive to examine two fundamental parameters which relate to their ultimate practicality. The first parameter can be defined as optical efficiency—in this case, the lumens of output per watt of input to the light source. The second is cost compatibility, that is, the extent to which the technology in question yields a cost effective solution to the requirements of a specific application.

Based on these parameters, a red/green/blue (RGB) semiconductor/microlaser system, consisting of three lasers or laser arrays, each operating at a fundamental color, appears to be the most efficient, high brightness, white light source for display applications to date. Semiconductor laser operation has been achieved from the UV to the IR range of the spectrum, using device structures based on InGaAlN, InGaAlP and InGaAlAs material systems. Desirable center wavelength ranges are 610-635 nm for red, 525-540 nm for green, and 445-470 nm for blue.

Laser radiation is inherently narrow band and gives rise to the perception of fully-saturated colors. Unfortunately, narrow band light incident on random rough surfaces also introduces an unacceptable image artifact known as "speckle". The visual effects of speckle detract from the aesthetic quality of an image and also result in a reduction of image resolution. Consequently, in the context of high resolution display systems, it is generally deemed essential that speckle be eliminated. A variety of "de-speckling" techniques can be used to reduce this artifact to "acceptable levels", but only at the expense of a further loss in efficiency, which negatively impacts cost, reliability, package size, and power consumption.

Known speckle reduction techniques tend to disturb the spatial or temporal coherence of laser beams through optical path randomization and/or spectral broadening. However, most of these solutions are expensive and technically complex, relying, for example, on mode-locking techniques to produce very short pulses in the order of 1 ps to increase the optical bandwidth. Ideally, the spectral bandwidth for a display light source should be on the order of several nanometers (i.e., 5-15 nm). Such a light source could be considered quasi-monochromatic—sufficiently broadband for the cancellation of speckle yet sufficiently narrow band for color purity.

SUMMARY OF THE INVENTION

The invention is directed to a laser-lit display system which uses a bandwidth-enhancing technique for reducing speckle.

According to one aspect of the invention, a laser-lit flat panel display includes a backlight with a plurality of lasing elements of at least two primary colors arranged in a plurality of laser assemblies. The plurality of lasing elements of at least one of the three primary colors are selected such that each lasing element emits a laser beam with a center wavelength $\lambda_{0i}$ and a spectral bandwidth $\Delta\lambda_i$. The center wavelength of at least one of the lasing elements is wavelength-shifted with respect to the center wavelength of at least one other lasing element. When combined, the laser beams have an ensemble spectrum $\Lambda$ with an overlap parameter $\gamma = \overline{\Delta\lambda_i}/\overline{S_i}$, where $\overline{\Delta\lambda_i}$ is a mean spectral bandwidth of the lasing elements and $\overline{S_i}$ is a mean wavelength shift between the center wavelengths $\lambda_{0i}$ of the at least one and the at least one other lasing elements. Ideally, $\overline{\Delta\lambda_i}$ and $\overline{S_i}$ are selected such that $\gamma \geq 1$. The laser-lit flat panel display also includes an array of light modulators arranged across the display for modulating light emitted by the backlight.

In one embodiment, each laser assembly in the flat panel display includes at least one lasing element of each primary color. At least one laser assembly includes a plurality of lasing elements of at least one primary color. A light guide in the backlight substantially distributes the light output by the laser assemblies across the flat panel display, aided by diffusion optics corresponding to the laser assemblies. Light emitted by the backlight is modulated by a liquid crystal display (LCD) panel.

The plurality of lasers in the flat panel display are positioned about an exterior edge of the light guide. For example, the plurality of lasers can be positioned about each exterior edge of the light guide or at corners of the light guide.

In one embodiment of the invention, the plurality of laser assemblies are arranged about the light guide in a plurality of rows. Each row of laser assemblies is configured for independent control with respect to laser assemblies in at least one other row. The laser assemblies are also configured such that the brightness of at least one color within at least one laser assembly can be controlled independently of other colors in the laser assembly. The flat panel display has a plurality of additional light guides, each of which corresponds to a row of laser assemblies and is separated from adjacent light guides by a reflective separator.

In another embodiment, the plurality of laser assemblies of the backlight are configured to directly illuminate the array of light modulators from behind with the aid of diffusion optics corresponding to the plurality of laser assemblies. The laser assemblies are arranged in an array behind the array of light modulators, and each laser assembly is configured to be controlled independently of at least one laser assembly in the same row and at least one laser assembly in the same column as the laser assembly. Each laser assembly includes at least one lasing element of each of the at least two primary colors. At least one laser assembly is configured such that the brightness of one color of laser is controllable independently of lasers of other colors in the assembly.

According to another aspect of the invention, a flat panel display includes a backlight with a plurality of lasing elements of at least two primary colors arranged in an array of laser assemblies. The display also includes an array of light modulators directly illuminated from behind by the plurality of laser assemblies and a plurality of optical elements for diffusing light from the laser assemblies across corresponding regions of the array of light modulators.

In one embodiment, each laser assembly in the display includes at least one lasing element of each of the at least two primary colors. Each laser assembly is configured to be controlled independently of at least one laser assembly in the same row and at least one laser assembly in the same column as the laser assembly. The laser assemblies are also configured such that the brightness of at least one color within each laser assembly can be controlled independently of other colors in the laser assembly.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

To provide an overall understanding of the invention, certain illustrative embodiments will now be described, including a bandwidth-enhanced laser light source for flat-panel displays, such as liquid crystal displays (LCDs). However, it will be understood by one of ordinary skill in the art that the apparatus described herein may be adapted and modified as is appropriate for the application being addressed and that the systems and methods described herein may be employed in other suitable applications, and that such other additions and modifications will not depart from the scope hereof.

Figure 1:
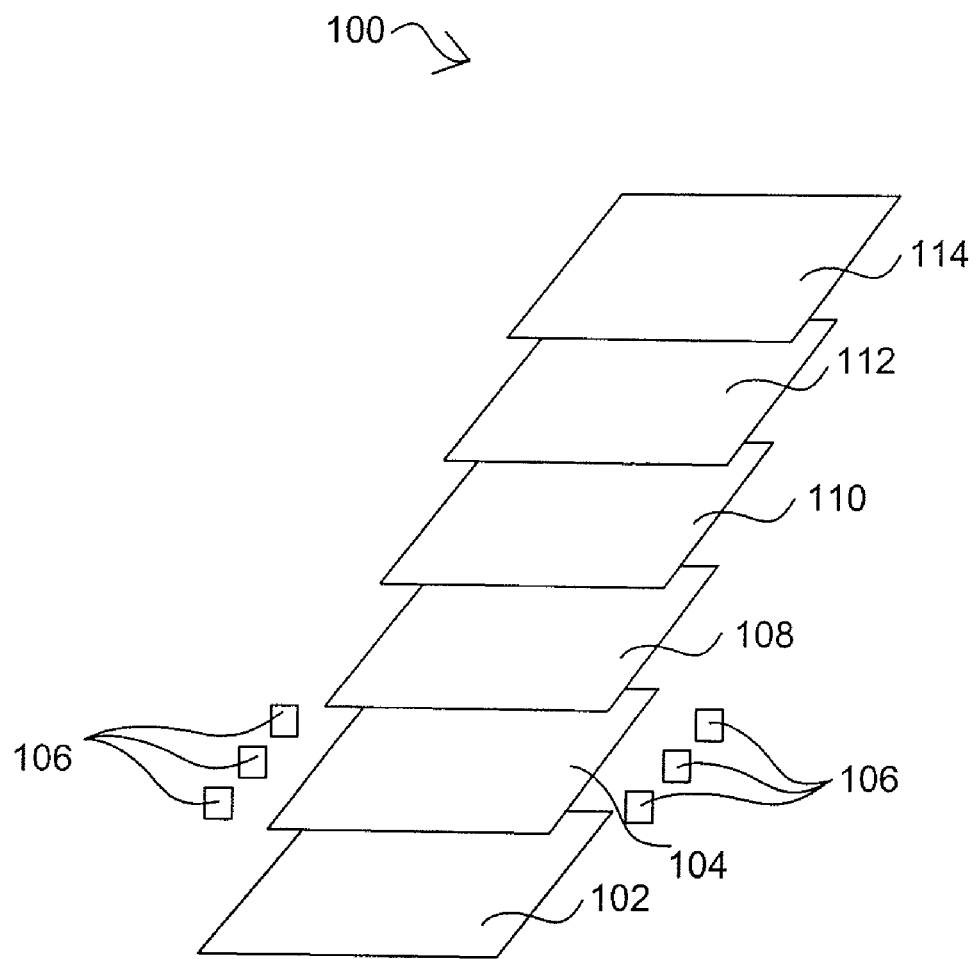
FIG. 1 shows schematically the layers of a liquid crystal display (LCD) screen.

FIG. 1 shows schematically the layers of a liquid crystal display (LCD) screen 100, according to an illustrative embodiment of the invention. At the back is a reflector 102 for directing light toward the front of the display. Light from the reflector passes through a light guide 104, usually made of molded transparent or white plastic. In one implementation, the light guide 104 has a plurality of microlenses molded into its surface to aid in extracting light at predetermined points. Suitable light guides can be obtained, for example, from Global Lighting Technologies (headquartered in Brecksville, Ohio). Positioned adjacent to the light guide 104 are laser assemblies 106, which provide light for the display. The laser assemblies 106 emit light into the light guide, which then distributes the light across the display. The light guide also serves to mix the light from the various laser assemblies to achieve a generally white light source. The laser assemblies, described further below in relation to FIGS. 5A and 5B, may be arranged around the light guide in various configurations, as described in relation to FIGS. 3-4. From the light guide 104, light passes through a diffuser sheet 108, which further diffuses light across the display. In front of the diffuser sheet 108 are two optical films, a brightness enhancing film 110 for directing light toward the viewer (for example, BEF II-T, which can be obtained under the brand name Vikuiti from 3M, headquartered in St. Paul, Minn.), and a polarizing film 112 (for example, DBEF II, which can also be obtained from 3M under the brand name Vikuiti). After being polarized, light extracted from the light guide 104 illuminates an LCD panel 114. LCD panels can be obtained, for example, from Sharp (headquartered in Osaka, Japan) and Samsung (headquartered in Seoul, Korea).

As mentioned above, laser illumination typically results in image speckle. However, as disclosed in U.S. Pat. No. 6,975,294, entitled Systems and Methods for Speckle Reduction through Bandwidth Enhancement, laser light sources formed from multiple lasers with certain frequency and bandwidth characteristics reduce if not eliminate speckle. The critical parameters for designing a bandwidth-enhanced laser array (BELA) include the number n of emitters in the array, the center wavelength $\lambda_{0i}$ of each emitter, the spectral separation $S_i$ between the center wavelength $\lambda_{0i}$ of an emitter i and the center wavelength $\lambda_{0j}$ of an emitter j being closest in wavelength, the respective bandwidth $\Delta\lambda_i$ of the individual emitters, and the relative output power $A_i$ of each emitter.

Figure 2A:
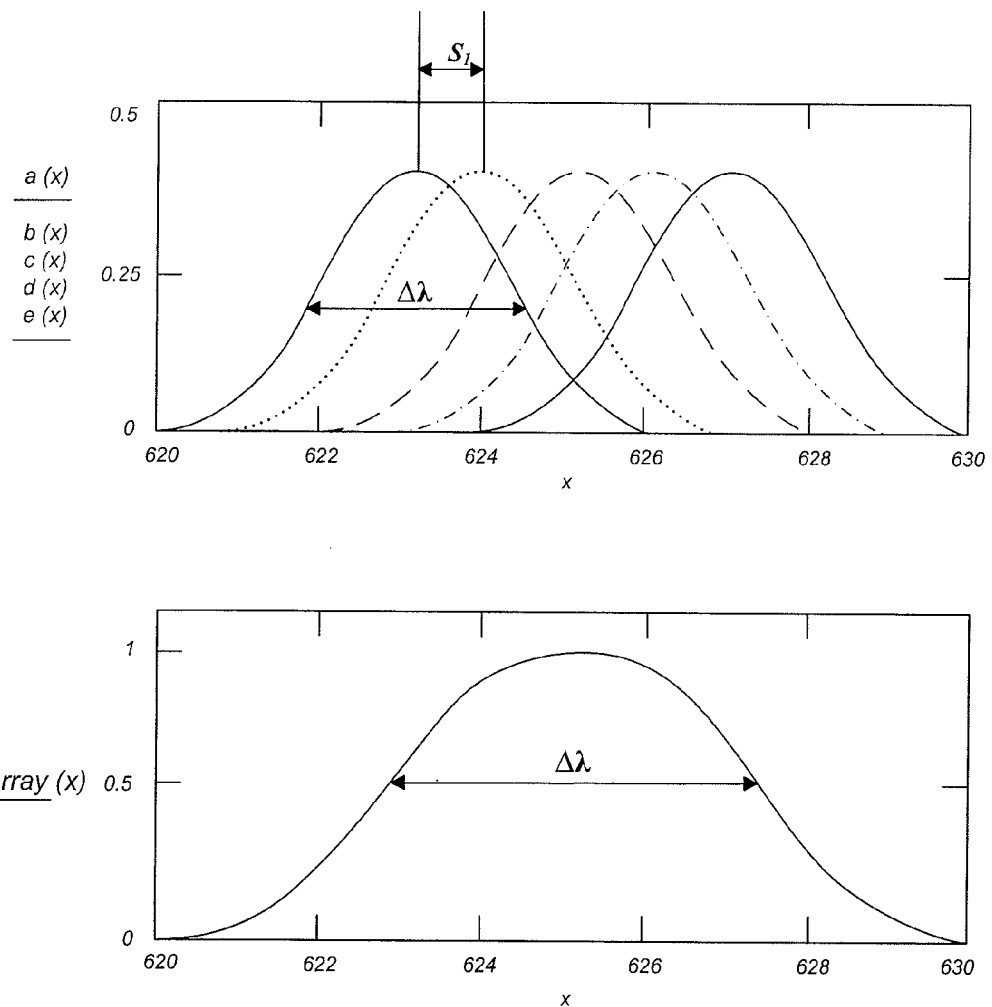
FIG. 2A shows schematically the spectral emission and the ensemble spectrum of five exemplary lasing elements having a mean spectral overlap parameter $\gamma > 1$.
Figure 2B:
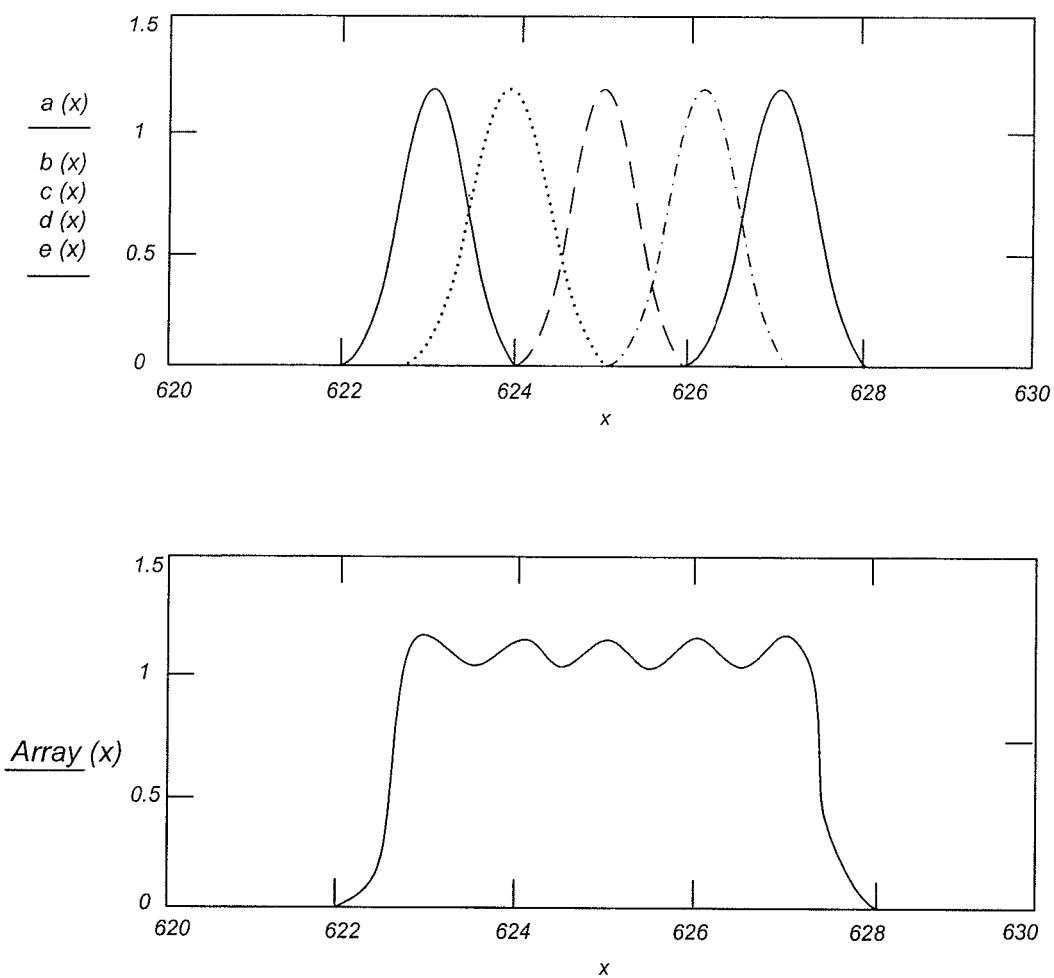
FIG. 2B shows schematically the spectral emission and the ensemble spectrum of five exemplary lasing elements having a mean spectral overlap parameter $\gamma = 1$.

FIGS. 2A and 2B depict the frequency and bandwidth characteristics of suitable laser light sources. Specifically, FIGS. 2A and 2B depict ensemble spectra of bandwidth-enhanced laser light produced from an array of spatially separated, discrete emitters of laser radiation. Each emitter has a respective spectral bandwidth $\Delta\lambda_i$ centered at some arbitrary red, green or blue wavelength $\lambda_{0i}$. The emitters of a particular color of laser light are designed to have slightly different central wavelengths, thereby creating an ensemble bandwidth $\Delta\Lambda$ which is greater than the bandwidth $\Delta\lambda_i$ of any individual emitter. By engineering the amount of ensemble bandwidth $\Delta\Lambda$ required for the cancellation of speckle, the quasi-monochromatic property responsible for the appearance of fully-saturated color is preserved. A mean spectral overlap parameter $\gamma = \overline{\Delta\lambda_i}/\overline{S_i}$, where $\overline{\Delta\lambda_i}$ is the mean spectral bandwidth of the emitters and $\overline{S_i}$ is the mean wavelength shift between center wavelengths as described above, can be associated with the ensemble wavelength characteristic of an array of emitters of a particular color. In a first scenario with $\gamma > 1$, shown in FIG. 2A, there exists substantial overlap in the spectra from the individual emitters (top FIG. 2A). The resulting ensemble spectrum $\Lambda$ is a smoothly varying function of wavelength and virtually free of any spectral features from the individual emitters (bottom FIG. 2A). This condition may be considered "ideal" for bandwidth enhancement since the spectral averaging that occurs produces a uniformly broadened distribution for $\gamma\gg1$ and a large number of emitters, thereby minimizing speckle.

For $\gamma=1$, as depicted in FIG. 2B, the ensemble spectrum $\Lambda$ shown at the bottom of FIG. 2B becomes a rippled function with local maxima coincident with the central wavelengths $\lambda_{oi}$ of the individual emitters. Values of $\gamma$ less than 1 have been found to be less efficient for reducing speckle than values of $\gamma$ greater than 1. Simulations using Fourier analysis suggest that coherent interference may be even more effectively suppressed with a non-uniform distribution of emitter intensities, with the possibility of eliminating speckle noise altogether.

The light source of the invention has a few advantages over the existing technologies used for the backlight for a liquid crystal flat panel display:

Compared to traditional cold cathode fluorescent lamps (CCFLs) or recently available light emitting diodes (LEDs), the lasers, generally speaking, can provide more saturated and expanded color gamut which is fully compatible with xvYCC standard for extended color space for moving pictures. The lasers can also provide highly-polarized and well-collimated beams which aid to increase the transmission efficiency and/or image contrast.

However, the traditional lasers used as a light source also generate unacceptable image artifact known as speckle, and often used de-speckling techniques or methods tend to reduce the aforementioned merits.

The laser light source design of the invention, on the other hand, relies on the aforementioned increased spectral bandwidth of the array of laser emitters to reduce speckle directly at the laser source. This is particularly beneficial when used in combination with the liquid crystal flat panels because these flat panel displays usually do not have enough space (i.e. depth) to adopt the additional de-speckling optics or devices.

In addition, the entire system's reliability, as measured in its mean time between failure (MTBF), can be improved by operating the array of laser emitters at less than their maximum rated output power, while still providing the cumulative laser power required to produce needed brightness. Accordingly, the array of lasers is expected, over time, to exhibit an inherently slower rate of performance degradation than a single, high power laser.

Therefore, the multiple array of laser emitters design described in the invention has an enormous advantage when used as a backlight unit for a liquid crystal flat panel display.

Figure 3:
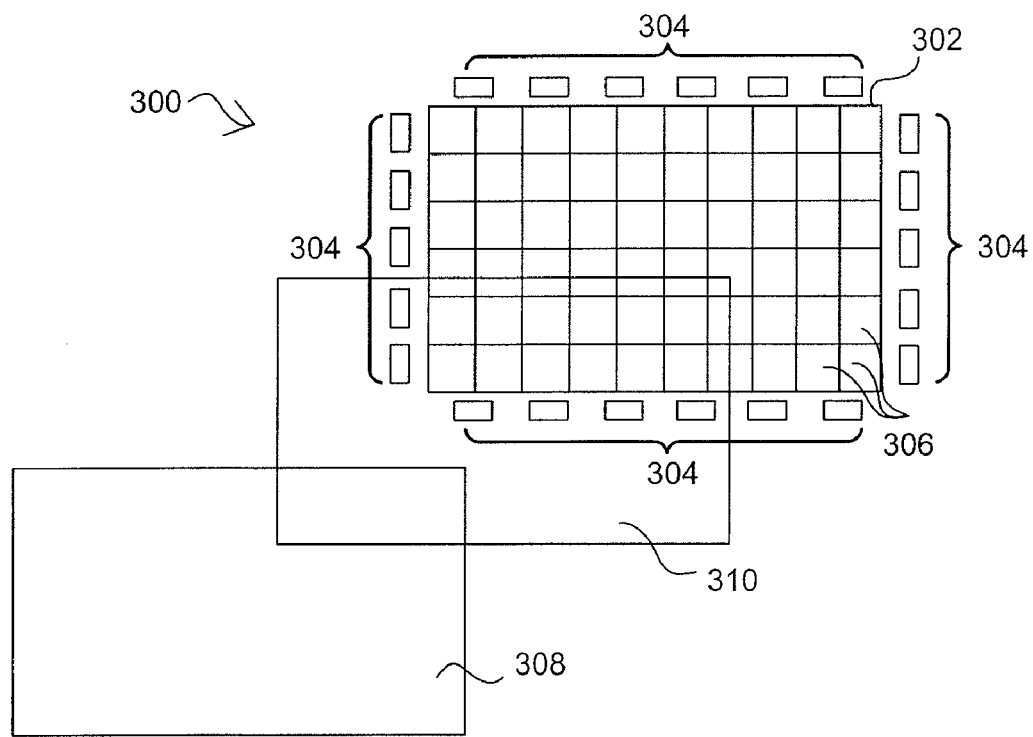
FIG. 3 shows schematically an illustrative configuration for a laser-illuminated backlight for a liquid crystal flat panel display according to an illustrative embodiment of the invention.

FIG. 3 is a schematic diagram of a laser illuminated backlight 300 for a liquid crystal flat panel display, such as the flat panel display 100 of FIG. 1, according to an illustrative embodiment of the invention. In one configuration, the backlight includes a light guide 302 surrounded along its edges by laser assemblies 304, described further below in relation to FIGS. 5A and 5B. In one implementation, the light guide 302 includes an array of microlenses 306 formed on or molded into a forward facing surface of the light guide. In alternative implementations, the backlight includes a highly reflective rear reflector, such as reflector 102 of FIG. 1, instead of, or in addition to, having the microlenses 306 molded on or into the light guide 302.

The backlight 300 includes a polarizing film 308 to polarize light emitted from the backlight to enable proper light modulation by the liquid crystal display to which the laser illuminated backlight 300 is coupled. Optionally, the backlight 300 also includes a diffuser sheet 310 between the light guide and the polarizing film 308 to diffuse the light emitted from the backlight 300.

The backlight 300 can be integrated with the remainder of a standard liquid crystal flat panel display module to form a complete flat panel display. For example, the backlight 300 can be coupled with an array of liquid crystal cells controlled by an active or passive matrix backplane disposed on a transparent substrate. The backplane and the laser assemblies are coupled to driver circuits governed by one or more controller circuits for controlling the intensity of the lasers and for addressing the individual liquid crystal cells, as described further below in FIG. 6. The complete display module also includes a color filter film, including an array of red, green, and blue color filters corresponding to respective liquid crystal cells, along with a second polarizing film, a brightness enhancing film, and a cover plate.

Figure 4A:
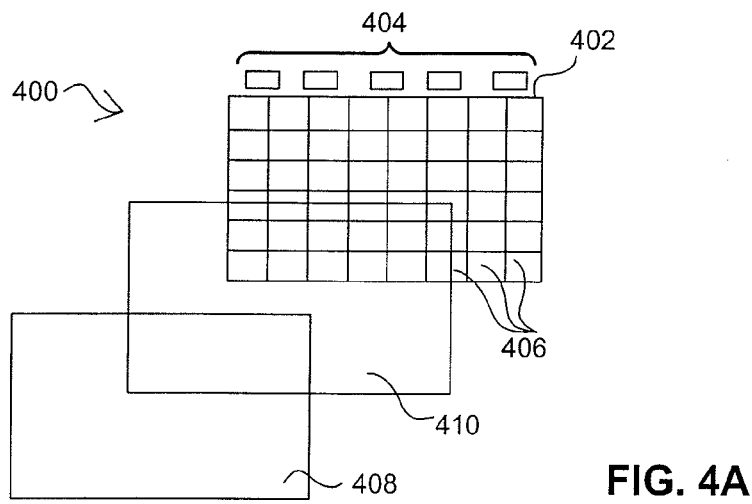
FIG. 4A shows schematically a second illustrative configuration for a laser-illuminated backlight for a liquid crystal flat panel display according to an illustrative embodiment of the invention.
Figure 4B:
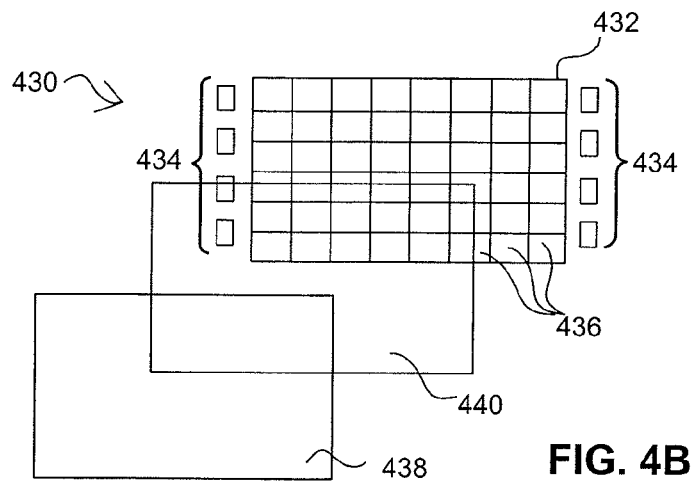
FIG. 4B shows schematically a third illustrative configuration for a laser-illuminated backlight for a liquid crystal flat panel display according to an illustrative embodiment of the invention.
Figure 4C:
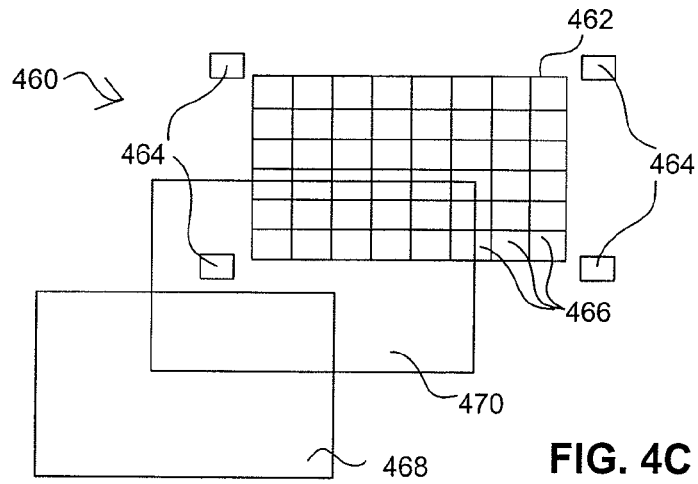
FIG. 4C shows schematically a fourth illustrative configuration for a laser-illuminated backlight for a liquid crystal flat panel display according to an illustrative embodiment of the invention.

Referring now to FIGS. 4A-4C, the number of laser assemblies used and their respective positions with respect to the light guide depends on the size of the display, the desired brightness of the display, and the level of color and brightness uniformity desired across the display. For example, in FIG. 4A, multiple laser assemblies 404 are positioned along a single edge of a light guide 402. In another configuration, in FIG. 4B, multiple laser assemblies 434 are positioned along two of the four edges of a light guide 432. In yet another configuration, depicted in FIG. 4C, multiple laser assemblies 464 are positioned at corners of a light guide 462. In each case, an appropriate light guide can be selected to achieve a desired level of light distribution. Ideally, the backlight should be designed to have enough numbers of laser assemblies to produce a homogenous white illumination field with uniform intensity. For instance, in a 20" diagonal liquid crystal flat panel display with 4:3 aspect ratio, 20 laser assemblies are positioned along each of the upper and lower edges of the light guide (i.e. a total of 40 laser assemblies are used) to produce well-balanced white with good brightness uniformity. This design yields approximately one laser assembly per 2-cm separation along the edge of the light guide. Other separation distances and/or distributions of laser assemblies may be employed without departing from the scope of the invention. For example the separation distance may scale in relationship to the size of the display. In one embodiment, the scaling factor for 4:3 aspect ratio displays is different than the scaling factor used in 16:9 aspect ratio displays. Spacing may also vary, and may be non-uniform in other embodiments. For example, fewer laser assemblies may be needed near the corner of displays in which laser assemblies are positioned along the side edges in addition to along the top and bottom edges.

Figure 5A:
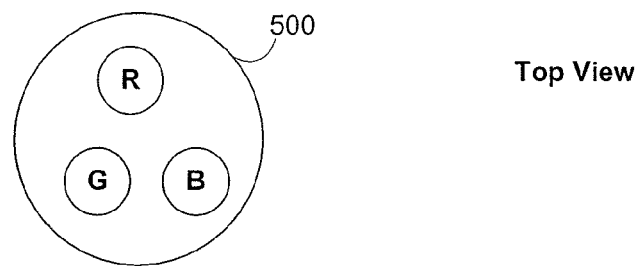
FIG. 5A shows schematically an illustrative configuration of a laser assembly for illuminating a liquid crystal display.
Figure 5A:
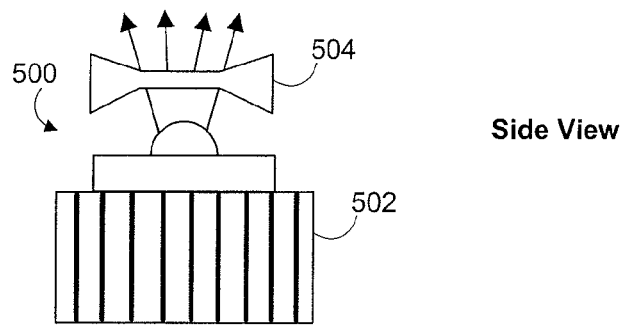

FIG. 5A is a schematic diagram of a first laser assembly 500 suitable for use as a laser assembly 304 incorporated into the laser illuminated backlight 300 of FIG. 3. In the laser assembly 500, individual lasers are arranged in two dimensions, for example in triangles or other geometric arrangement. As illustrated, each laser assembly includes red (R), green (G), and blue (B) lasers. While only a single laser of each color is depicted in FIG. 5A, each laser assembly 500 may include one or multiple lasers of each color, each having a slightly different center wavelength, as described in relation to FIG. 2, to generate an ensemble wavelength suitable for reducing speckle in a resulting image. Alternatively, the ensemble $\lambda$ may be achieved by the mixing of light from multiple laser assemblies within the light guide 302. In addition, due to power outputs of the different lasers used to generate each color, each laser assembly 500 may not have the same number of each color of laser. That is, more lasers may be required to generate the desired light output of one color than another. Lasers of a generally same color (e.g. red lasers with slightly different center wavelengths) may be clustered together within the assembly 500 or they may be intermixed with lasers of other colors. In some embodiments, one or more colors can be provided by a light-emitting diode. Preferably, the number, ensemble wavelength, and power of the lasers are selected such that when the output of the lasers in all laser assemblies 500 is mixed, the result is a substantially pure white light source, which when modulated, yields an image substantially free of speckle.

The laser assembly 500 also includes a heat sink 502 for dissipating heat generated by the lasers incorporated into the assembly. In one embodiment, to promote diffusion of the laser light and proper color mixing within the light guide 302, the laser assembly includes an optical element, such as a concave lens 504, positioned between the lasers and the light guide.

Figure 5B:
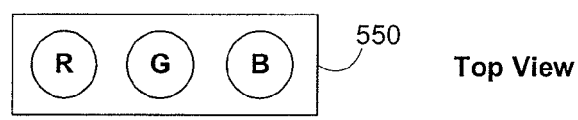
FIG. 5B shows schematically a second illustrative configuration of a laser assembly for illuminating a liquid crystal display.
Figure 5B:
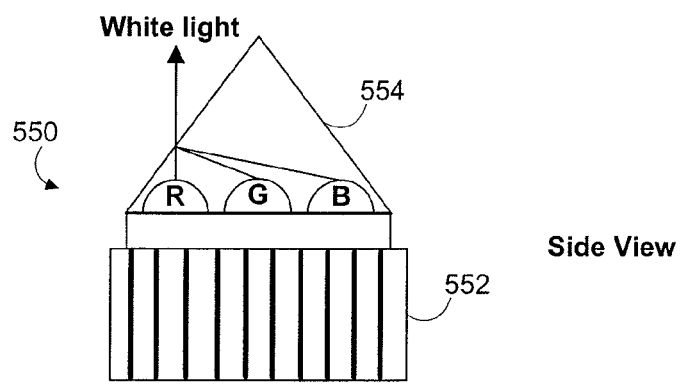

FIG. 5B is a schematic diagram of a second laser assembly 550 suitable for use as the as a laser assembly 304 incorporated into the laser illuminated backlight 300 of FIG. 3. In the laser assembly 550, individual lasers are arranged in a linear or single dimension fashion. As illustrated, each laser assembly includes red (R), green (G), and blue (B) lasers. While only a single laser of each color is depicted in FIG. 5B, each laser assembly 550 may include one or multiple lasers of each color, each having a slightly different center wavelength, as described in relation to FIG. 2, to generate an ensemble wavelength suitable for reducing speckle in a resulting image. Alternatively, the ensemble λ may be achieved by the mixing of light from multiple laser assemblies within the light guide 302. In addition, due to power outputs of the different lasers used to generate each color, each laser assembly 550 may not have the same number of each color of laser. That is, more lasers may be required to generate the desired light output of one color than another. Lasers of a generally same color (e.g. red lasers with slightly different center wavelengths) may be clustered together within the assembly 550 or they may be intermixed with lasers of other colors. In some embodiments, one or more colors can be provided by a light-emitting diode. Preferably, the number, ensemble wavelength, and power of the lasers are selected such that when the output of the lasers in all laser assemblies 500 is mixed, the result is a substantially pure white light source, which when modulated, yields an image substantially free of speckle.

The laser assembly 550 also includes a heat sink 552 for dissipating heat generated by the lasers incorporated into the assembly. In one embodiment, to promote diffusion of the laser light and proper color mixing within the light guide 302, the laser assembly 550 includes an optical element, such as an equilateral prism 554, positioned between the lasers and the light guide 302.

Figure 6:
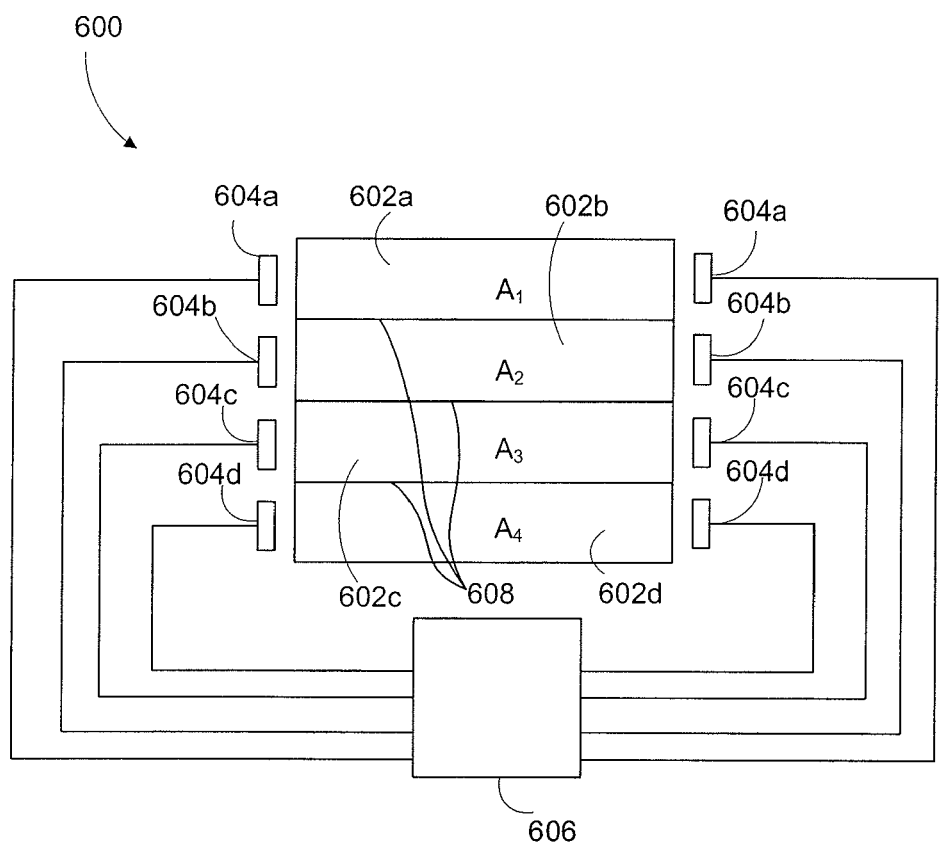
FIG. 6 shows schematically an illustrative configuration for area-dimming control on an edge-lit backlight for a liquid crystal display.

FIG. 6 is a schematic diagram of a laser illuminated edge-lit backlight 600 with area-dimming control for a liquid crystal flat panel display. In one illustrative configuration, the display is divided into four regions $A_1$, $A_2$, $A_3$, and $A_4$, each with its own light guide 602a, 602b, 602c, and 602d, respectively. Each region is illuminated by a row of laser assemblies 604a, 604b, 604c, and 604d, respectively. The laser assemblies are coupled to a set of driver circuits (not shown) and controlled by one or more controller chips 606. Each row of laser assemblies can be controlled independently of the other rows of laser assemblies to adjust the brightness in a particular region of the display. The intensity of a color within each laser assembly can also be controlled independently of the other colors in the assembly. In one embodiment, reflective separators or air gaps 608 are positioned between the light guides 602 to facilitate independent control of the brightness of each region of the display. In alternative configurations, the display may have fewer than or more than four rows, depending on the granularity of area dimming desired.

Figure 7:
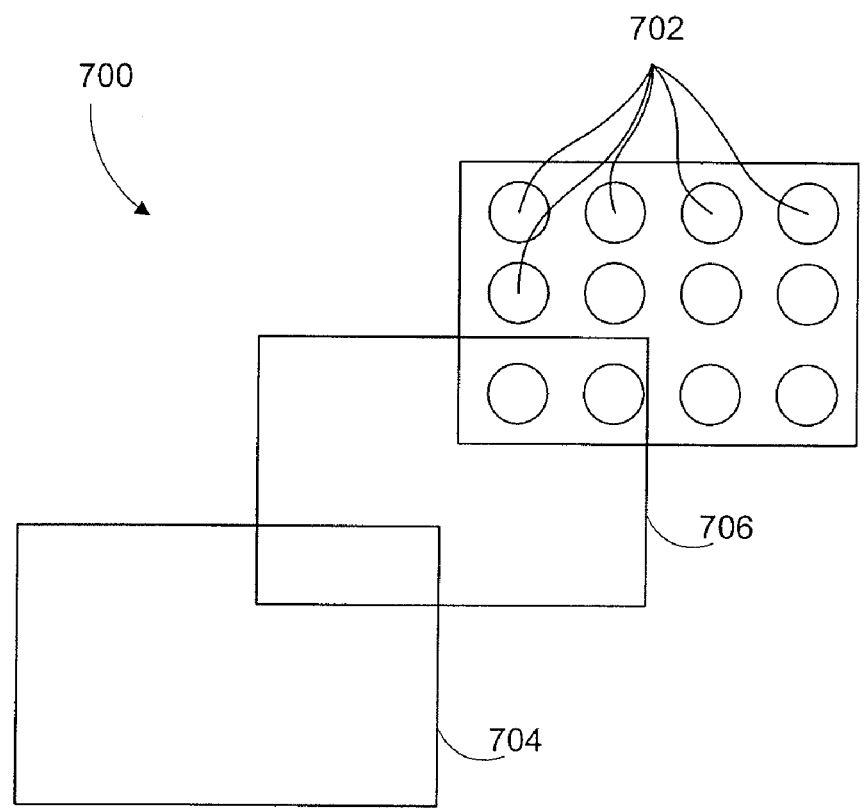
FIG. 7 shows schematically a laser-illuminated backlight for a liquid crystal flat panel display in an alternative illustrative embodiment of the invention.

FIG. 7 is a schematic diagram of a laser illuminated direct lit backlight 700 for a liquid crystal flat panel display, according to another illustrative embodiment of the invention. The backlight includes a plurality of laser assemblies 702, as described above in FIGS. 5A and 5B, mounted on a highly reflective rear reflector in a rectangular array. Each laser assembly provides light for an entire predetermined region of the display, without the need for scanning the laser. The desired field of illumination is achieved by selection of suitable optical elements 504 in the laser assemblies.

The backlight 700 includes a polarizing film 704 to polarize light emitted from the backlight to enable proper light modulation by the liquid crystal display to which the laser illuminated backlight 700 is coupled. Optionally, the backlight 700 also includes a diffuser sheet 706 between the light guide and the polarizing film 704 to diffuse the light emitted from the backlight 700.

The backlight 700 can be integrated with the remainder of a standard liquid crystal flat panel display module to form a complete flat panel display. For example, the backlight 700 can be coupled with an array of liquid crystal cells controlled by an active or passive matrix backplane disposed on a transparent substrate. The backplane and the laser assemblies are coupled to driver circuits governed by one or more controller circuits for controlling the intensity of the lasers in different regions of the display and for addressing the individual liquid crystal cells. Each laser assembly can be controlled independently of other assemblies in the same row and column, and the intensity of a color within a laser assembly can be controlled independently of the other colors in the assembly, similar to the description above in relation to FIG. 6. The complete display module also includes a color filter film, including an array of red, green, and blue color filters corresponding to respective liquid crystal cells, along with a second polarizing film, a brightness enhancing film, and a cover plate.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A flat panel display, comprising:
   a backlight including a plurality of lasing elements of at least two primary colors arranged in a plurality of laser assemblies, wherein:
       the backlight comprises a light guide for substantially distributing light output by the plurality of laser assemblies across the flat panel display,
       the plurality of laser assemblies are positioned about an exterior edge of the light guide,
       the plurality of lasing elements of at least one of the three primary colors are selected such that each lasing element emits a laser beam with a center wavelength $\lambda_{oi}$ and a spectral bandwidth $\Delta\lambda_i$,
       the center wavelength of at least one of the lasing elements is wavelength-shifted with respect to the center wavelength of at least one other lasing element, and
       said laser beams, when combined, have an ensemble spectrum Λ with an overlap parameter $\gamma = \overline{\Delta\lambda_i}/\overline{S_i}$ with $\overline{\Delta\lambda_i}$ being a mean spectral bandwidth of the lasing elements and $\overline{S_i}$ being a mean wavelength shift between the center wavelengths $\lambda_{oi}$ of the at least one and the at least one other lasing elements, with $\overline{\Delta\lambda_i}$ and $\overline{S_i}$ selected such that $\gamma \geq 1$; and an array of light modulators arranged across the flat panel display for modulating light emitted by the backlight.

2. The flat panel display of claim 1, wherein each laser assembly includes at least one lasing element of each primary color.

3. The flat panel display of claim 1, wherein at least one laser assembly includes a plurality of lasing elements of at least one primary color.

4. The flat panel display of claim 1, wherein the light modulators comprise a liquid crystal display (LCD) panel.

5. The flat panel display of claim 1, comprising diffusion optics corresponding to the plurality of laser assemblies.

6. The flat panel display of claim 1, wherein the plurality of laser assemblies are positioned about each exterior edge of the light guide.

7. The flat panel display of claim 1, wherein the plurality of laser assemblies are positioned at corners of the light guide.

8. The flat panel display of claim 1, wherein the plurality of laser assemblies are arranged about the light guide in a plurality of rows.

9. The flat panel display of claim 8, wherein each row of laser assemblies is configured for independent control with respect to laser assemblies in at least one other row.

10. The flat panel display of claim 9, wherein the laser assemblies are configured such that the brightness of at least one color within at least one laser assembly can be controlled independently of other colors in the laser assembly.

11. The flat panel display of claim 8, comprising a plurality of additional light guides, wherein each light guide corresponds to a row of laser assemblies.

12. The flat panel display of claim 11, comprising reflective separators positioned between the plurality of light guides.

* * * * *